United States Patent
Miao et al.

(10) Patent No.: US 12,555,862 B2
(45) Date of Patent: Feb. 17, 2026

(54) INSTALLATION DEVICE, BATTERY, ELECTRIC DEVICE, MANUFACTURING METHOD AND MANUFACTURING EQUIPMENT FOR BATTERY

(71) Applicant: CONTEMPORARY AMPEREX TECHNOLOGY (HONG KONG) LIMITED, Hong Kong (CN)

(72) Inventors: Huimin Miao, Ningde (CN); Zhijie Huang, Ningde (CN); Xiaoyin Yu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 675 days.

(21) Appl. No.: 17/968,817

(22) Filed: Oct. 19, 2022

(65) Prior Publication Data
US 2023/0216129 A1 Jul. 6, 2023

Related U.S. Application Data (63) Continuation of application No. PCT/CN2021/143589, filed on Dec. 31, 2021.

(51) Int. Cl.
*H01M 50/262* (2021.01)
*H01M 50/244* (2021.01)
*H01M 50/505* (2021.01)

(52) U.S. Cl.
CPC ....... *H01M 50/262* (2021.01); *H01M 50/244* (2021.01); *H01M 50/505* (2021.01); *H01M 2220/20* (2013.01)

(58) Field of Classification Search
None
See application file for complete search history.

(56) References Cited

U.S. PATENT DOCUMENTS

2014/0186676 A1* 7/2014 Ebisawa ............. H01M 50/209
429/100
2019/0260099 A1 8/2019 Ju et al.

FOREIGN PATENT DOCUMENTS

CN 106099002 A * 11/2016 ............... B60K 1/04
CN 206564274 U 10/2017
(Continued)

OTHER PUBLICATIONS

Machine translation of CN-106099002-A (Year: 2016).*
(Continued)

*Primary Examiner* — Gregg Cantelmo
(74) *Attorney, Agent, or Firm* — XSENSUS LLP (57) ABSTRACT

The present disclosure provides an installation device, a battery, an electric device, a manufacturing method and a manufacturing equipment for the battery. The installation device is used for the battery including a case body, the installation device includes a base and a bracket, the base is configured to be connected to the case body; the bracket is configured to assemble an electrical connector of the battery, and is configured to be slidably connected with the base. The installation device according to the embodiment of the present application can reduce the operation space required by the installation device to fix the electrical connector while realizing the quick fixation of the electrical connector, so as to facilitate the installation of the electrical connector in a limited space. Furthermore, the space occupancy rate of the battery case by the installation device can be reduced, the space utilization rate of the battery case can be improved, and the energy density of the battery can be improved.

17 Claims, 6 Drawing Sheets

(56) References Cited

FOREIGN PATENT DOCUMENTS

| | | |
|---|---|---|
| CN | 207568346 U | 7/2018 |
| CN | 209000997 U | 6/2019 |
| CN | 209454546 U | 10/2019 |
| CN | 210191142 U | 3/2020 |
| CN | 211654904 U | 10/2020 |
| CN | 212062508 U | 12/2020 |
| CN | 213782200 U | 7/2021 |
| DE | 102019134469 A1 | 7/2020 |
| EP | 3836246 A1 | 6/2021 |
| JP | 3040774 B1 | 5/2000 |
| JP | 2007019041 A | 1/2007 |
| JP | 2013114951 A * | 6/2013 |

OTHER PUBLICATIONS

Machine translation of JP-2013114951-A (Year: 2013).*
Extended European Search Report issued Sep. 5, 2023 in European Patent Application No. 21925098.2, 7 pages.
International Search Report issued May 24, 2022 in International Patent Application No. PCT/CN2021/143589, 7 pages.

* cited by examiner

INSTALLATION DEVICE, BATTERY, ELECTRIC DEVICE, MANUFACTURING METHOD AND MANUFACTURING EQUIPMENT FOR BATTERY

CROSS-REFERENCE TO RELATED APPLICATIONS

The present application is a continuation of International Application No. PCT/CN2021/143589, filed Dec. 31, 2021, the entire contents of which is incorporated herein by reference in its entirety.

TECHNICAL FIELD

The present application relates to the technical field of battery, and in particular, to an installation device, a battery, an electric device, a manufacturing method and a manufacturing equipment for the battery.

BACKGROUND

This section is merely provided as background information related to the present disclosure and is not necessarily prior art.

Energy saving and emission reduction is the key to the sustainable development of the automobile industry, and electric vehicles are becoming an important portion of the sustainable development of the automobile industry due to their advantages of energy saving and environmental protection. For electric vehicles, battery technology is an important factor in terms of its development.

The battery pack is often provided with an electrical connector such as a busbar therein, so as to facilitate the electrical communication in the battery pack and the circuit connection between the battery pack and the whole workshop. In order to ensure the safety of the battery pack under different working conditions, it is necessary to fix and restrain the an electrical connector such as the busbar. Moreover, as the battery pack has higher and higher requirements for energy density, the internal space of the battery pack is greatly compressed, so it is an urgent problem to realize the fixation of the electrical connector such as busbar in a limited operating space.

SUMMARY

Embodiments of the present application provide an installation device, a battery, an electric device, a manufacturing method and a manufacturing equipment for the battery, so as to realize the installation of an electrical connector in a limited space.

In a first aspect, the present application provides an installation device for a battery including a case body, the installation device includes a base and a bracket, the base is configured to be connected to the case body; the bracket is disposed to assemble an electrical connector of the battery and is configured to be slidably connected to the base.

In the technical solution of the present application, the installation device includes the base and the bracket, the base is connected to the case body of the battery, the electrical connector of the battery is assembled onto the bracket, and the bracket is slidably connected to the base, thereby realizing a quick installation of the electrical connector. By disposing the bracket to be slidably connected to the base, the operation space required by the installation device to fix the electrical connector can be reduced, and the installation of the electrical connector in a limited space can be realized. Furthermore, the space occupancy rate of the battery case by the installation device can be reduced, and the space utilization rate of the battery case can be improved, thereby the energy density of the battery can be improved.

In some embodiments, the installation device further includes a sliding assembly disposed on the base and the bracket and configured to allow the bracket to slide relative to the base along a first direction, the first direction being a height direction of the battery. By enabling the bracket to slide relative to the base in the first direction via the sliding assembly, the layout characteristics of the manipulation space inside the case body of the battery can be fully utilized, and thereby the installation and positioning of the electrical connector can be facilitated.

In some embodiments, the sliding assembly includes a sliding guide and a sliding member, wherein the sliding guide extends along the first direction and is disposed on one of the base and the bracket, the sliding member is disposed on the other of the base and the bracket, and the sliding member is slidably engaged with the sliding guide. With the engagement of the sliding guide and the sliding member, the sliding stability of the bracket relative to the base along the height direction of the battery can be improved.

In some embodiments, the sliding guide is a sliding groove, the sliding member is a sliding block matched with the sliding groove, and the sliding block is slidably engaged with the sliding groove. By disposing the sliding guide as a sliding groove and the sliding member as a sliding block, the structure is simple and is convenient to manufacture, so the manufacturing difficulty of the installation device can be reduced, and the manufacturing cost of the installation device can be reduced.

In some embodiments, the installation device further includes a locking assembly disposed on the base and the bracket, and the locking assembly is configured to lock the bracket onto the base when the bracket moves to a preset position relative to the base. By locking the bracket onto the base via the locking assembly, the shaking of the bracket relative to the base can be reduced, thereby the shaking of the electrical connector in the case body of the battery can be reduced, and the safety of the battery can be improved.

In some embodiments, the locking assembly includes a slot disposed on one of the base and the bracket and an inserting member disposed on the other of the base and the bracket, and the inserting member is capable of being inserted into the slot when the bracket moves to a preset position relative to the base. When the bracket slides relative to the base, inserting member can abut against the other one of the base and the bracket, thereby guiding and supporting the movement of the bracket relative to the base, and relieving the shaking generated when the bracket slides relative to the base, ensuring that the inserting member is inserted into the slot at the preset position, and effectively locking the bracket onto the base.

In some embodiments, the inserting member is inclined relative to the sliding direction of the bracket. On one hand, the distance between the bracket and the base can be reduced, and on the other hand, the inserting member can play a certain guiding role, further ensuring that the inserting member is inserted into the slot at the preset position, and thereby effectively locking the bracket onto the base.

In some embodiments, a free end of the inserting member is higher than a fixed end of the inserting member. The inserting member is inclined relative to the sliding direction of the bracket, and the free end of the inserting member is higher than the fixed end of the inserting member, so the inserting member can play a better guiding role, further ensuring that the inserting member is inserted into the slot at the preset position, and thereby effectively locking the bracket onto the base.

In some embodiments, the bracket includes a bracket body and a holding member, the bracket body is slidably connected to the base, the holding member is disposed on a side of the bracket body away from the base, and an installation space for assembling the electrical connector of the battery is defined between the holding member and the bracket body. By disposing the base to be slidably connected to the base via the bracket body, the overall slidable connection of the bracket to the base can be facilitated. By disposing the holding member on the side of the bracket body away from the base to define the installation space between the holding member and the bracket body, the assembly of the bracket with electrical connector can be facilitated.

In some embodiments, the holding member includes a first portion connected to a side of the bracket body facing away from the base and a second portion located above the first portion and connected to the first portion, and the installation space for assembling electrical connector of the battery is defined by the first portion, the second portion, and the bracket body. By providing the first portion and the second portion so as to define the installation space on the side of the bracket body away from the base, the installation of the electrical connector can be facilitated.

In some embodiments, the holding member further includes a third portion connected to the second portion and extending toward the bracket body, the installation space for assembling the electrical connector of the battery is defined by the first portion, the second portion, the third portion and the bracket body, and an opening for the electrical connector of the battery to pass through is defined between the third portion and the bracket body. By providing the third portion extending toward the bracket body, the displacement of the electrical connector of the battery in the installation space along the height direction of the battery can be restricted, and the shaking of the electrical connector along the height direction of the battery can be reduced.

In some embodiments, an end surface of a free end of the third portion is an inclined surface, and the inclined surface includes a first edge away from a bottom of the case body and a second edge close to the bottom of the case body, and a distance from the first edge to the bracket body is greater than a distance from the second edge to the bracket body. In this way, when the electrical connector is installed in the installation space, the inclined end face of the free end of the third portion can play a guiding role, so that the electrical connector can slide into the installation space more smoothly through the opening, thereby the installation and fixation of the electrical connector can be facilitated.

In some embodiments, a supporting member is provided on the side of the bracket body away from the base, and a guide surface for guiding the electrical connector of the battery to slide into the installation space is formed on the supporting member. The guide surface on the supporting member can guide the electrical connector of the battery to slide into the bottom of the installation space, and meanwhile, the supporting member can abut against the electrical connector of the battery, thereby restricting the electrical connector of the battery to move in the direction perpendicular to the height direction of the battery, enabling the electrical connector to be fixed in the installation space more tightly.

In some embodiments, the supporting member has a hollow structure that allows the supporting member to deform so that the electrical connector is clamped between the support and the second portion. In this way, the installation space can be equipped with different types of electrical connectors, thereby improving the applicability of the installation device.

In some embodiments, the base further includes a bearing member, the bearing member is disposed on the base, and the bearing member is configured to bear the bracket when the bracket moves to a preset position relative to the base. The bearing member can provide a bearing force while restricting the bracket from continuing to slide along the base, such that the bracket can be stably connected to the base.

In some embodiments, the base further includes an extension member, the extension member is located above the bearing member and connected with the bearing member, and the extension member is configured to enable the bracket to abut against the base when the bracket moves to the preset position relative to the base. By the extension member above the bearing member, the movement of the bracket along the direction perpendicular to the height direction of the battery can be restricted, such that the bracket can be completely fixed onto the base.

In some embodiments, the bracket further includes a reinforcing rib, and the reinforcing rib is disposed between the bracket body and the holding member, so as to improve the structural strength of the installation device.

In a second aspect, the present application provides a battery including the installation device according to the first aspect.

In the battery according to the embodiments of the present application, the installation device is disposed on the case body, the base of the installation device is connected to the case body of the battery, the electrical connector of the battery is assembled onto the bracket, and the bracket is slidably connected to the base, thereby realizing a quick installation of the electrical connector. By disposing the bracket to be slidably connected to the base, the operation space required by the installation device to fix the electrical connector can be reduced, and the installation of the electrical connector in a limited space can be realized. Furthermore, the space occupancy rate of the battery case by the installation device can be reduced, and the space utilization rate of the battery case can be improved, thereby the energy density of the battery can be improved.

In a third aspect, the present application provides an electric device including the battery described in the second aspect.

The electric device according to the embodiment of the present application uses the battery described in the second aspect as a power supply system. The battery includes the installation device including the base and the bracket, the base of the installation device is connected to the case body of the battery, the electrical connector of the battery is assembled onto the bracket, and the bracket is slidably connected to the base, thereby realizing a quick installation of the electrical connector. By disposing the bracket to be slidably connected to the base, the operation space required by the installation device to fix the electrical connector can be reduced, and the installation of the electrical connector in a limited space can be realized. Furthermore, the space occupancy rate of the battery case by the installation device can be reduced, and the space utilization rate of the battery case can be improved, thereby the energy density of the battery can be improved.

In a fourth aspect, the present application provides a manufacturing method for a battery, including: providing a case body; providing an installation device including a base and a bracket; connecting the base to the case body; connecting the bracket slidably to the base; providing an electrical connector; assembling the electrical connector onto the bracket.

In the battery manufactured by the manufacturing method for the battery according to the embodiment of the present application, the installation device is disposed on the case body, the base of the installation device is connected to the case body of the battery, the electrical connector of the battery is assembled onto the bracket, and the bracket is slidably connected to the base, thereby realizing a quick installation of the electrical connector. By disposing the bracket to be slidably connected to the base, the operation space required by the installation device to fix the electrical connector can be reduced, and the installation of the electrical connector in a limited space can be realized. Furthermore, the space occupancy rate of the battery case by the installation device can be reduced, and the space utilization rate of the battery case can be improved, thereby the energy density of the battery can be improved.

In a fifth aspect, the present application provides a manufacturing equipment for a battery, including a first providing device configured to provide a case body; a second providing device configured to provide an installation device including a base and a bracket, and a third providing device configured to provide an electrical connector, an assembling device configured to connect the base to the case body, connect the bracket slidably to the base, and assemble the electrical connector onto the bracket.

In the battery manufactured by the manufacturing equipment for a battery according to the embodiment of the present application, the installation device is disposed on the case body, the base of the installation device is connected to the case body of the battery, the electrical connector of the battery is assembled onto the bracket, and the bracket is slidably connected to the base, thereby realizing a quick installation of the electrical connector. By disposing the bracket to be slidably connected to the base, the operation space required by the installation device to fix the electrical connector can be reduced, and the installation of the electrical connector in a limited space can be realized. Furthermore, the space occupancy rate of the battery case by the installation device can be reduced, and the space utilization rate of the battery case can be improved, thereby the energy density of the battery can be improved.

The above description only refers to an overview of the technical solution of the present application. In order to understand the technical means of the present application more clearly, it can be implemented according to the content of the description. In order to make the above-mentioned and other purposes, features and advantages of the present application more apparent, the specific embodiments of the present application are listed below.

BRIEF DESCRIPTION OF THE DRAWINGS

In order to illustrate the technical solutions in the embodiments of the present disclosure and the prior art more explicitly, the accompanying drawings required in the embodiments and the prior art will be briefly illustrated below. Apparently, the accompanying drawings described in the following description are only used to illustrate some embodiments of the present disclosure, and other drawings may also be obtained by the ordinary person skilled in the art according to the accompanying drawings without any creative effort.

The reference numerals are listed as below:

electric device 10;
battery 11, controller 12, motor 13;
battery cell 111, battery case 112;
upper cover 1121, case body 1122;
installation device 100, electrical connector 200;
base 110, bracket 120, locking assembly 140, sliding assembly 150;
bracket body 121, holding member 122, supporting member 123, reinforcing rib 124;
bearing member 131, extension member 132;
slot 141, inserting member 142;
sliding guide 151, sliding member 152;
first portion 1221 second portion 1222, third portion 1223; guide surface 1231;
conductive busbar 201, insulating layer 202, wear-resistant tube 203.

DESCRIPTION OF EMBODIMENTS

The embodiments of the technical solutions of the present application will be described in detail below with reference to the accompanying drawings. The following embodiments are only used to illustrate the technical solutions of the present application more explicitly, and are thus only interpreted as examples, rather than used to limit the protection scope of the present application.

Unless otherwise defined, all technical and scientific terms used herein have the same meaning as commonly understood by the ordinary person skilled in the technical field of the present application. The terms used herein are merely for the purpose of describing specific embodiments, and are not intended to limit the present application. The terms "comprising", "including" and any variations thereof in the specification and claims of the present application and in the above description of the drawings are intended to cover non-exclusive inclusion.

In the description according to the embodiments of the present application, the technical terms "first", "second", and the like are only used to distinguish different objects, and should not be understood as indicating or implying relative importance or implying the number, specific order or primary and secondary relationship of indicated technical features. In the description according to the embodiments of the present application, "a plurality of" means two or more, unless otherwise expressly and specifically defined.

Reference herein to an "embodiment" means that a specific feature, structure, or characteristic described in connection with the embodiment can be included in at least one embodiment of the present application. The appearances of the phrase in various places in the specification are not necessarily all referring to the same embodiment, nor a separate or alternative embodiment that is mutually exclusive of other embodiments. It shall be explicitly and implicitly understood by those skilled in the art that the embodiments described herein may be combined with other embodiments.

In the description according to the embodiments of the present application, the term "and/or" only refers to an association relationship for describing associated objects, indicating that three kinds of relationships may exist. For example, A and/or B may indicate the following three relations; A exists alone, A and B exist simultaneously, and B exists alone. In addition, the character "/" herein generally indicates that the related objects are in an "or" relationship.

In the description according to the embodiments of the present application, the term "a plurality of" refers to two or more (including two), and similarly, the term "a plurality of groups" refers to two or more groups (including two groups), and the term "a plurality of sheets" refers to two or more sheets (including two sheets).

In the description according to the embodiments of the present application, the directions or positional relationships indicated by the technical terms such as "center", "longitudinal", "transverse", "length", "width", "thickness", "upper", "lower", "front", "rear", "left", "right", "vertical" "horizontal", "top", "bottom", "inside", "outside", "clockwise", "counterclockwise", "axial", "radial", "circumferential" and the like, are only for the convenience of describing the present disclosure and simplifying the description, rather than indicating or implying that the involved device or element must have a specific orientation or must be configured or operated in the specific orientation, therefore, they cannot be understood as limiting the present disclosure.

In the description according to the embodiments of the present application, unless otherwise expressly specified and defined, the technical terms "installed", "connected to", "connected with", "fixed" or the like should be interpreted in a broad sense. For example, a connection may refer to a fixed connection, a disassembly connection or an integral connection; or may refer to a mechanical connection or an electrical connector; or may refer to a direct connection or an indirect connection through an intermediate medium; or may refer to an internal communication between the two elements or the interaction relationship between the two elements. For the ordinary person skilled in the art, the specific meanings of the above terms in the present disclosure may be interpreted according to specific situations.

Nowadays, from the perspective of development of the market situation, the power batteries are applied increasingly. The power batteries are not only used in energy storage power systems such as water power plant, fire power plant, wind power plant and solar power plant, but also in electric transportations such as electric bicycles, electric motorcycles, electric vehicles, as well as in military equipment, aerospace and other fields. With continuously increasing application of the power batteries, the market demand is also constantly expanding.

The inventor found that, in order to realize the connection of the circuit in the battery pack, an electrical connector such as a busbar is mostly used in the power battery system as a high-voltage connection, and a high-voltage busbar is fixed to a high-voltage connector terminal fixed on the case body, to realize the circuit connection between the battery pack and the whole workshop. However, in order to ensure the safety of the battery pack under different working conditions, it is necessary to fix and restrain the electrical connector such as the busbar. Usually, the electrical connector such as the busbar is fixed inside the battery pack by a tie, and a tie fixing hole is required to be machined on the case body in advance or a tie fixing bracket is required to be provided on the case body in advance. In this manner, the structure of the case body or the bracket of the battery pack is made complicated, and the fixing method is not reliable. On one hand, the loosening problems may occur under working conditions such as transport, vibration, and impact; and on the other hand, the wear of the tie on the electrical connector may be relatively serious. In addition, as the battery pack has higher and higher requirements for energy density, the internal space is significantly compressed, so it is an urgent problem to realize the fixation of electrical connector in a limited operating space.

In view of the above problems, the inventor designed an installation device including a base and a bracket after in-depth study. By connecting the base to the case body, assembling the electrical connector onto the bracket, and connecting the bracket slidably to the base, the electrical connector of the battery can be quickly fixed in a limited space.

The installation device disclosed in the embodiment of the present application may be used in a battery including a case body and an electrical connector, to reduce the operation space required for fixing the electrical connector in the case body, improve the space utilization rate of the case body of the battery, and further improve the energy density of the battery.

The battery disclosed in the embodiment of the present application may be used in, but not limited to, an electric device such as a vehicle, a ship, or an aircraft. The electric device may be, but not limited to, a mobile phone, a tablet, a notebook computer, an electric toy, an electric tool, a battery car, an electric vehicle, a ship, a spacecraft, and the like. The electric toy may include a stationary or mobile electric toy, such as a game console, an electric car toy, an electric ship toy, an electric airplane toy and the like. The spacecraft may include an airplane, a rocket, a space shuttle, and a spaceship.

For convenience of description, the following embodiments are described by taking the electric device 10 provided by some embodiments of the present application as an example.

Figure 1:
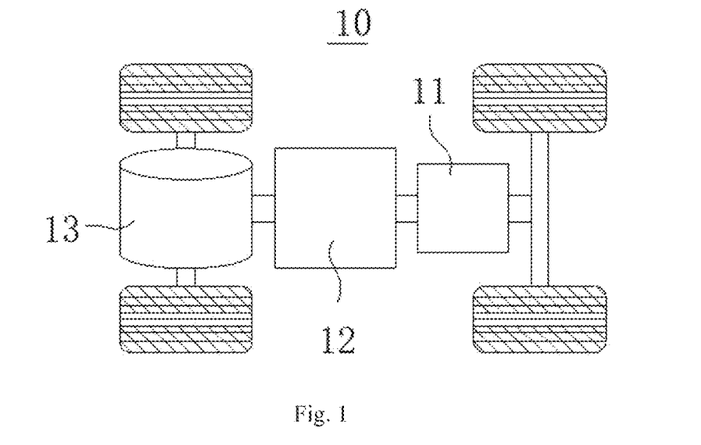
FIG. 1 is a schematic structural diagram of a vehicle according to some embodiments of the present application.

Please refer to FIG. 1, wherein FIG. 1 is a schematic structural diagram of a vehicle 10 according to some embodiments of the present application. The vehicle 10 may be a fuel vehicle, a gas vehicle, or a new energy vehicle, and the new energy vehicle may be a pure electric vehicle, a hybrid vehicle, or an extended-range vehicle. The vehicle 10 may be provided with a battery 11, a controller 12 and a motor 13 therein, and the controller 12 is configured to control the battery 11 to supply power to the motor 13. For example, the battery 11 may be disposed at the bottom, front, or rear of the vehicle 10. The battery 11 may be configured to supply power to the vehicle 10, for example, the battery 11 may be used as an operating power source of the vehicle 10 for the circuit system of the vehicle 10, for example, to satisfy the operating power requirements of the vehicle 10 when starting, navigating and running.

In another embodiment of the present application, the battery 11 may not only be used as the operating power source of the vehicle 10, but also may be used as the driving power source of the vehicle 10 so as to provide driving power for the vehicle 10 in place of or partially in place of fuel or natural gas.

Figure 2:
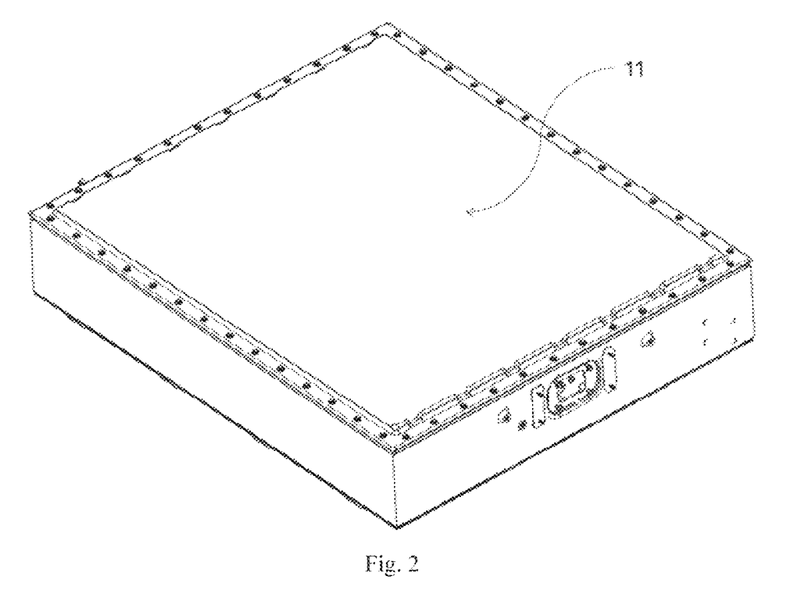
FIG. 2 is a schematic structural diagram of a battery according to some embodiments of the present application.
Figure 3:
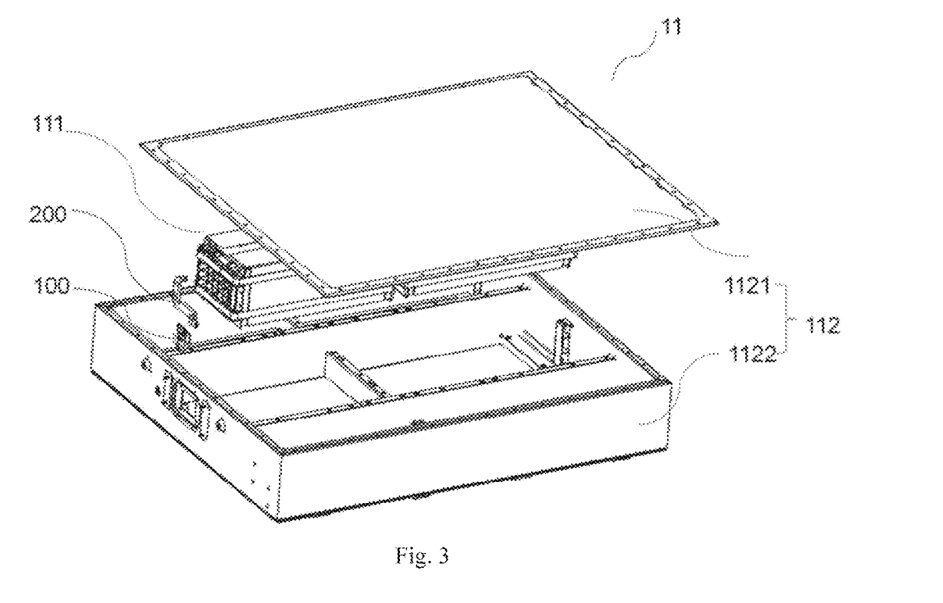
FIG. 3 is a schematic diagram of an exploded structure of a battery according to some embodiments of the present application.
Figure 4:
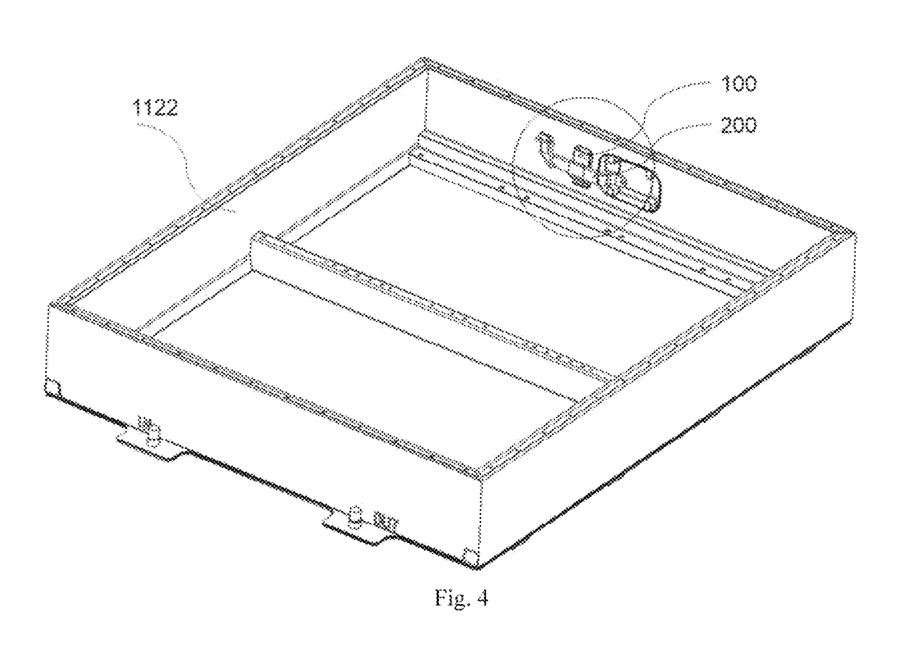
FIG. 4 is a schematic structural diagram of an installation device for fixing an electrical connector to a case body according to some embodiments of the present application.
Figure 5:
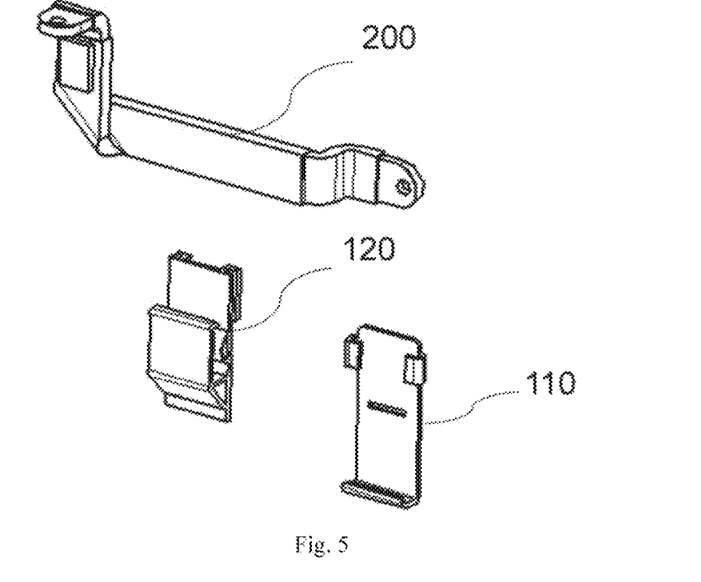
FIG. 5 is a schematic diagram of an exploded structure of an installation device and an electrical connector according to some embodiments of the present application.
Figure 6:
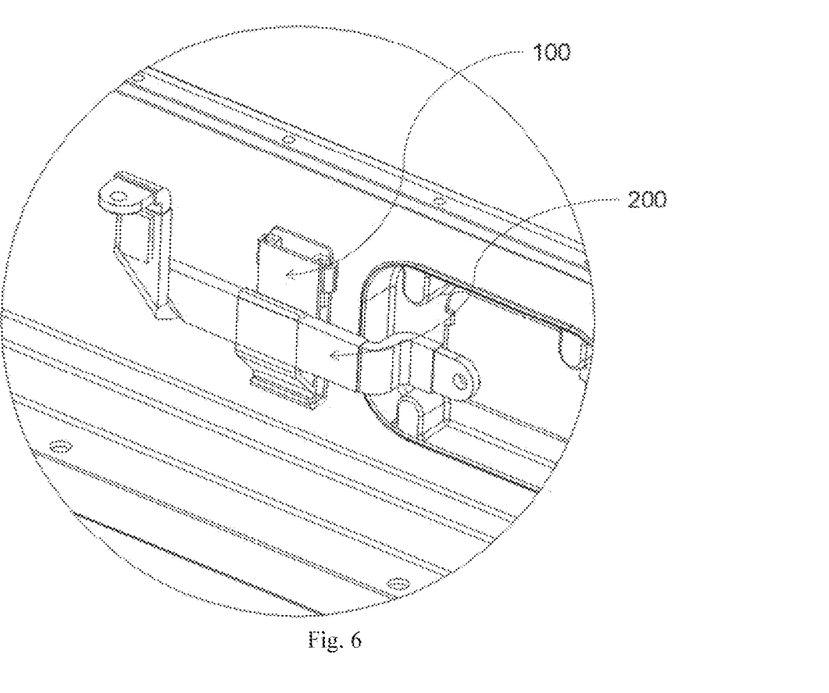
FIG. 6 is a partial enlarged schematic diagram of FIG. 4.

Please refer to FIG. 2 and FIG. 3, wherein FIG. 2 is a schematic structural diagram of a battery according to some embodiments of the present application, and FIG. 3 is a schematic diagram of an exploded structure of a battery according to some embodiments of the present application. The battery 11 mentioned in the embodiments of the present application refers to a single physical module including one or a plurality of battery cells 111 to provide higher voltage and capacity. For example, the battery 11 mentioned in the present application may include a battery module, a battery pack or the like. The battery 11 may include an electrical connector 200 for electrical communication between the battery packs or for electrical communication between the battery pack and the electric device. For example, the battery 11 generally includes a battery case 112 for packaging one or more battery cells 111. The battery case 112 can prevent liquid or other foreign matter from affecting charging or discharging of the battery cells 111. Specifically, the battery case 112 may include an upper cover 1121 and a case body 1122, and the upper cover 1121 and the case body 1122 are fastened together. The shapes of the upper cover 1121 and the case body 1122 may be determined according to the combined shape of the plurality of battery cells 111.

The plurality of battery cells 111 may be connected in series and/or in parallel via poles for various applications. In some high-power applications such as electric vehicles, the battery 11 includes three levels in terms of its application, a battery cell 111, a battery module and a battery pack. The battery module is formed by electrically connecting a certain number of battery cells 111 together and placing them into a frame in order to protect the battery cells 111 from external shock, heat, vibration, and the like. The battery pack is the final state of the battery system loaded into an electric vehicle. At present, most battery packs are made by assembling various control and protection systems such as a battery management system (BMS), a thermal management component and the like onto one or more battery modules. With development of technology, the level of the battery module can be omitted, that is, the battery pack is directly formed from the battery cells 111. This improvement makes the weight energy density and volume energy density of the battery system increase while the number of components is significantly reduced. The battery mentioned in the present application include a battery module or a battery pack.

In the present application, the battery cell 111 may include a lithium ion secondary battery, a lithium ion primary battery, a lithium sulfur battery, a sodium lithium ion battery, a sodium ion battery, or a magnesium ion battery, but the embodiment of the present application is not limited thereto. The battery cell 111 may be in a shape of a cylinder, a flat body, a rectangular parallelepiped, or other shape, but the embodiment of the present application is not limited thereto. The battery cell 111 is generally divided into three types according to the packaging method: a cylindrical battery cell, a square-shaped battery cell, and a soft-pack battery cell, but the embodiment of the present application is not limited thereto.

As shown in FIG. 2, FIG. 4 to FIG. 8, embodiments of the first aspect of the present application provide an installation device 100 for the battery 11, and the battery 11 includes a case body 1122. The installation device 100 includes a base 110 and a bracket 120, the base 110 is configured to be connected to the case body 1122, and the bracket 120 is disposed to assemble the electrical connector 200 of the battery 11 and is configured to be slidably connected with the base 110.

The installation device 100 refers to an installation structure in which the electrical connector 200 is fixedly disposed in the battery 11.

The case body refers to a base structure for bearing the battery cells 111. It is hollow, so as to accommodate battery cells 111. For example, the case body of the battery 11 in a quadrangular shape includes a frame formed by connecting longitudinal and transverse beams, a bottom plate, and four side plates connected to the bottom plate. The case body may be a base made of a metal material (such as iron, copper, steel, alloy, or the like) with a certain strength, so as to have better structural stability and bearing capacity. It shall be understood that the case body may also be made of insulating material.

The base 110 refers to a base structure for fixing the bracket 120 onto the case body 1121 of the battery 11, and may be a block-like structure or a plate-like structure, preferably a plate-like structure. For example, the base 110 may be a sheet metal piece. The base may be fixed onto the case body by welding or gluing.

The bracket 120 refers to a structure configured to assemble the electrical connector 200 of the battery 11 and slidably connected to the base 110 in the embodiment of the present application. The bracket 120 may be made of plastic material. Alternatively, the bracket 120 may also partially include metal and partially include plastic, according to actual needs. The bracket 120 may be a one-piece structure formed by injection molding or the like.

In the technical solution of the present application, the installation device 100 includes the base 110 and the bracket 120, the base 110 is connected to the case body 1122 of the battery 11, the electrical connector 200 of the battery 11 is assembled onto the bracket 120, and the bracket 120 is slidably connected to the base 110, thereby achieving a quick installation of the electrical connector 200. By disposing the bracket 120 to be slidably connected to the base 110, the operation space required by the installation device 100 to fix the electrical connector 200 can be reduced, and the installation of the electrical connector 200 in a limited space can be realized. Furthermore, the space occupancy rate of the case body 1122 of the battery 11 by the installation device 100 can be reduced, the space utilization rate of the case body 1122 of the battery 11 can be improved, and thus the energy density of the battery 11 can be improved.

Figure 7:
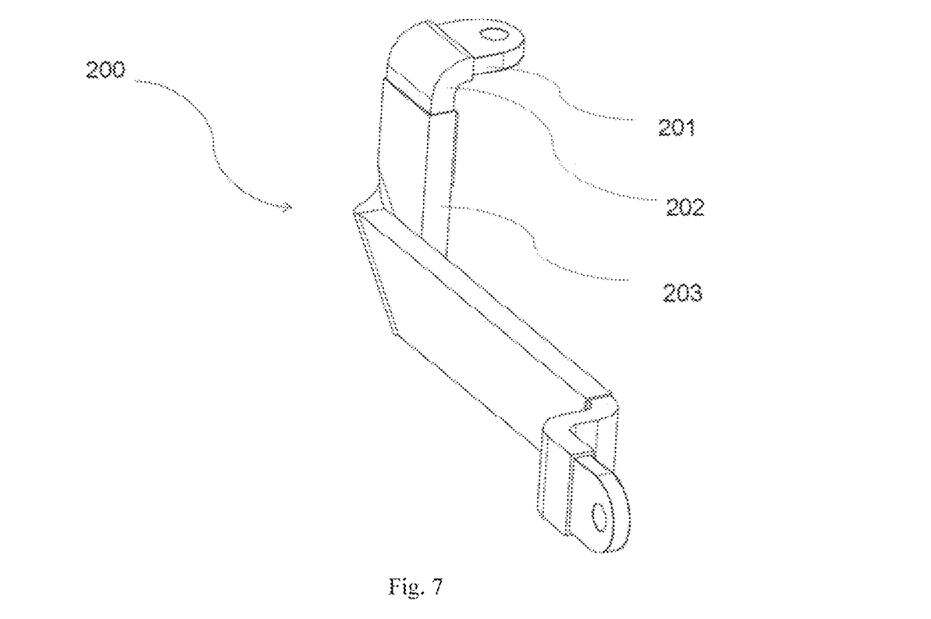
FIG. 7 is a schematic structural diagram of an electrical connector according to some embodiments of the present application.

In some embodiments, the electrical connector 200 may be used for electrical connection between battery packs, and may also be connected to a high-voltage connector terminal to realize circuit connection between the battery pack and the electric device. As shown in FIG. 7, the electrical connector 200 may include a conductive busbar 201. The conductive busbar 201 may be made of copper or aluminum. An insulating layer 202 is covered onto an outer portion of the conductive busbar, to avoid short-circuit of the electrical connector 200. The insulating layer 202 may be a plastic insulating layer. A wear-resistant tube 203 may be provided outside the electrical connector 200 to reduce abrasion of the insulating layer 202, thereby avoiding short-circuit of the electrical connector 200 and improving the safety of the battery. The wear-resistant tube 203 may be a wear-resistant braided mesh tube or the like, but the embodiment of the present application is not particularly limited thereto.

Figure 8:
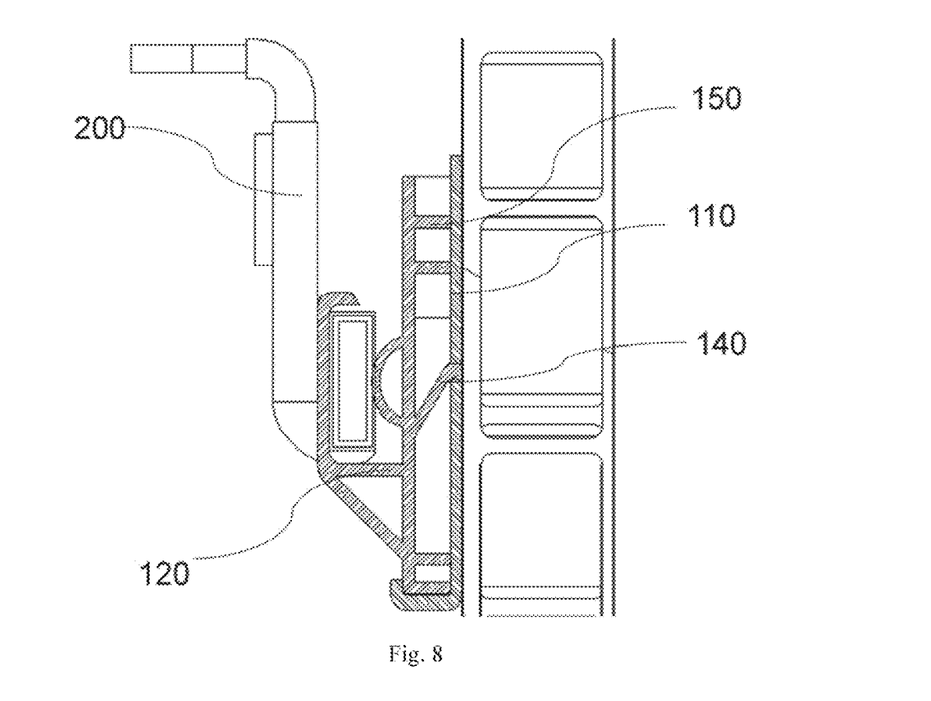
FIG. 8 is a schematic structural diagram of an installation device onto which an electrical connector is assembled according to some embodiments of the present application (the electrical connector is a copper bar)

In some embodiments, as shown in FIG. 8, the installation device further includes a sliding assembly 150. The sliding assembly 150 is disposed on the base 110 and the bracket 120, and is configured to enable the bracket 120 to slide relative to the base 110 along a first direction, and the first direction is a height direction of the battery 11.

The sliding assembly 150 refers to an assembly for enabling the bracket 120 to slide relative to the base 110 along the height direction of the battery 11. The sliding assembly 150 may include a first component and a second component which are slidingly engaged with each other, the first component may be connected to one of the base 110 and the bracket 120, and the second component is connected to the other of the base 110 and the bracket 120.

The height direction of the battery may also be understood as the height direction of the case body 1122.

Generally, the transverse operation space between a side wall of the case body 1122 of the battery 11 and the battery cell 111 is small while the longitudinal operation space (the longitudinal direction refers to the height direction of the battery) therebetween is large, so the electrical connector 200 is generally pressed into the gap between the side wall of the case body 1122 of the battery 11 and the battery cell 111 from top to bottom along the height direction of the case body 1122 of the battery 11, and is moved by enabling the bracket 120 to slide relative to the base 110 along the first direction by the sliding assembly 150. Therefore, the layout characteristics of the manipulation space inside the case body 1122 can be fully utilized, and thereby the installation and positioning of the electrical connector 200 can be facilitated.

Figure 9:
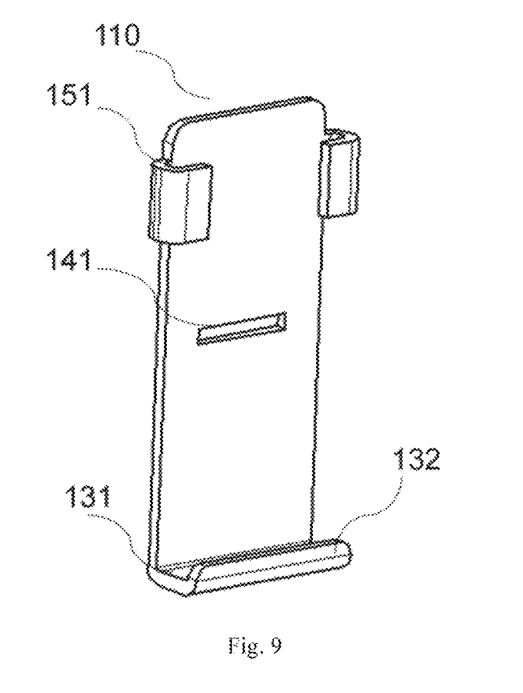
FIG. 9 is a schematic structural diagram of a base according to some embodiments of the present application.
Figure 10:
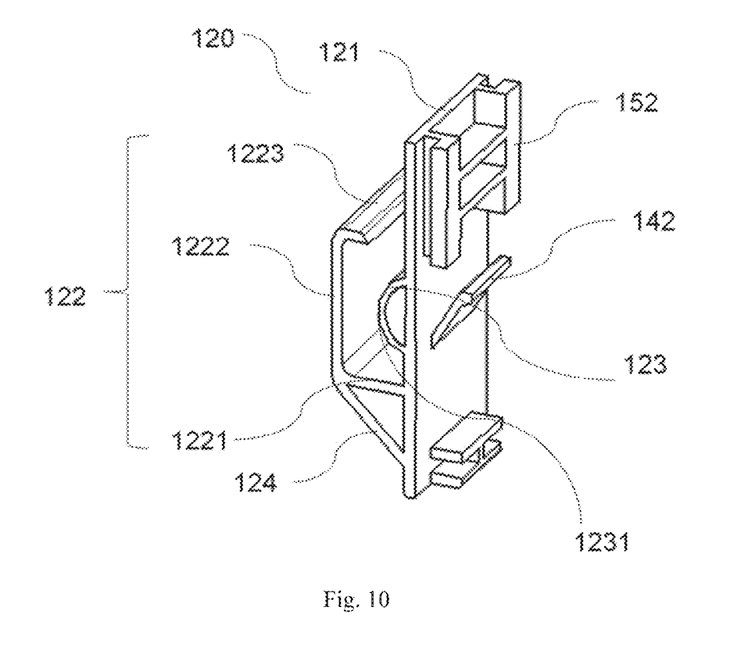
FIG. 10 is a schematic structural diagram of a bracket according to some embodiments of the present application.

In some embodiments, as shown in FIG. 9 and FIG. 10, the sliding assembly 150 includes a sliding guide 151 and a sliding member 152. The sliding guide 151 extends along the first direction and is disposed on one of the base 110 and the bracket 120, the sliding member 152 is disposed on the other of the base 110 and the bracket 120, and the sliding member 152 is slidably engaged with the sliding guide 151.

The sliding guide 151 refers to a structure that is slidably engaged with the sliding member 152 and guides the sliding member 152 to move along the first direction. The sliding guide 151 may be a rail structure or a groove structure, such as a sliding rail or a sliding groove, disposed on one of the base 110 and the bracket 120 and extending along the first direction.

The sliding member 152 refers to a component that engages with the sliding guide 151 and is movable along the sliding guide 151. The sliding member 152 may be a block-like structure disposed on the other of the base 110 and the bracket 120. The block-like structure includes a protrusion matched with the sliding rail or the sliding groove such that the sliding member 152 is connected to the sliding guide 151 and is slidable along the sliding guide 151.

Through the engagement of the sliding guide 151 and the sliding member 152, the stability of sliding of the bracket 120 relative to the base 110 in the height direction of the battery 11 can be improved.

In some embodiments, the sliding guide 151 is a sliding groove, the sliding member 152 is a sliding block matched with the sliding groove, and the sliding block is slidably fitted into the sliding groove. This structure is simple and is convenient to manufacture, so the manufacturing difficulty of the installation device 100 can be reduced, and the manufacturing cost of the installation device 100 can be reduced.

In some embodiments, as shown in FIG. 8, the installation device 100 further includes a locking assembly 140. The locking assembly 140 is disposed on the base 110 and the bracket 120, and the locking assembly 140 is configured to lock the bracket 120 onto the base 110 when the bracket 120 is moved to a preset position relative to the base 110.

The locking assembly 140 refers to a structural member for terminating the sliding of the bracket 120 relative to the base 110 and locking the bracket 120 onto the base 110.

The bracket 120 may be locked onto the base 110 by the locking assembly 140, so the shaking of the bracket 120 relative to the base 110 can be reduced, thereby the shaking of the electrical connector in the case body 1122 of the battery 11 can be reduced and the safety of the battery 11 can be improved.

In some embodiments, as shown in FIG. 9 and FIG. 10, the locking assembly 140 includes a slot 141 disposed on one of the base 110 and the bracket 120, and an inserting member 142 disposed on the other of the base 110 and the bracket 120. The inserting member 142 is insertable into the slot 141 when the bracket 120 moves to the preset position relative to the base 110.

The slot refers to a slot hole disposed on one of the base 110 and the bracket 120 and having a certain depth, for example, a through slot penetrating through the base 110 or the bracket 120, or a groove not penetrating through the base 110 or the bracket 120.

The inserting member 142 refers to a structural member that engages with the slot to lock the bracket 120 onto the base 110. The inserting member 142 has a certain rigidity and elasticity, and can undergo local elastic deformation. The inserting member 142 may be integral with the other one of the base 110 and the bracket 120, and may include plastic material.

When the bracket 120 slides relative to the base 110, the inserting member 142 can abut against the other one of the base 110 and the bracket 120, thereby guiding and supporting the movement of the bracket 120 relative to the base 110, and relieving the shaking generated when the bracket 120 slides relative to the base 110, ensuring that the inserting member 142 is inserted into the slot 141 at the preset position, and effectively locking the bracket 120 onto the base 110.

In some embodiments, as shown in FIG. 10, the inserting member 142 is inclined relative to the sliding direction of the bracket 120. On one hand, the distance between the bracket 120 and the base 110 can be reduced, and on the other hand, the inserting member 142 can play a certain guiding role, further ensuring that the inserting member 142 is inserted into the slot 141 at the preset position, and thereby effectively locking the bracket 120 onto the base 110.

In some embodiments, as shown in FIG. 10, a free end of the inserting member 142 is higher than a fixed end of the inserting member 142.

The free end of the inserting member 142 refers to an end opposite to the fixed end of the inserting member 142.

The fixed end of the inserting member 142 refers to an end of the inserting member 142 connected to the other of the base 110 and the bracket 120.

The inserting member 142 is inclined relative to the sliding direction of the bracket 120, and the free end of the inserting member 142 is higher than the fixed end of the inserting member 142, so the inserting member 142 can play a better guiding role, further ensuring that the inserting member 142 is inserted into the slot 141 at the preset position, and thereby effectively locking the bracket 120 onto the base 110.

In some embodiments, as shown in FIG. 10, the bracket 120 includes a bracket body 121 and a holding member 122. The bracket body 121 is slidably connected to the base 110, and the holding member 122 is disposed on a side of the bracket body 121 away from the base 110. An installation space for assembling the electrical connector 200 of the battery 11 is defined between the holding member 122 and the bracket body 121.

The bracket body 121 refers to a body portion of the bracket that is configured to connect with the base 110. The bracket body 121 may be a block-like structure with a hollow structure or a plate-like structure. The bracket body 121 may include various materials, for example, a plastic material with certain elasticity and rigidity, so the weight of the bracket 120 can be reduced.

The holding member 122 refers to a portion of the bracket 120 that is configured to hold the electrical connector 200. The two portions of the bracket 120 may be one-piece structure formed by casting, injection molding, and the like. Alternatively, the bracket 120 may be formed by connecting and combining two separate components. The specific structure can be freely selected according to the actual cost and process difficulty.

The bracket body 121 is slidably connected to the base 110, so the bracket 120 can be easily slidably connected to the base as a whole. The holding member 122 is disposed on the side of the bracket body 121 away from the base 110, and the installation space is defined between the holding member 122 and the bracket body 121, and thereby the assembly of the bracket 120 with the electrical connector 200 can be facilitated.

In some embodiments, as shown in FIG. 10, the holding member 122 includes a first portion 1221 connected to a side of the bracket body 121 away from the base 110, and a second portion 1222 located above the first portion 1221 and connected to the first portion 1221. The installation space for assembling the electrical connector 200 of the battery 11 is defined by the first portion 1221, the second portion 1222 and the bracket body 121.

The first portion 1221 may be a plate perpendicular to the height direction of the battery, and the second portion 1222 may be a plate parallel to the height direction of the battery and connected to the first portion 1221.

By disposing the first portion 1221 and the second portion 1222 to define the installation space on the side of the bracket body 121 away from the base 110, the installation of the electrical connector 200 can be facilitated.

In some embodiments, as shown in FIG. 10, the holding member 122 further includes a third portion 1223, and the third portion 1223 is connected to the second portion 1222 and extends toward the bracket body 121. The installation space for assembling the electrical connector 200 of the battery 11 is defined by the first portion 1221, the second portion 1222, the third portion 1223 and the bracket body 121, and an opening for the electrical connector 200 of the battery 11 to pass through is defined between the third portion 1223 and the bracket body 121.

The third portion 1223 may be a plate perpendicular to the height direction of the battery and connected to the second portion 1222, and a length of the third portion 1223 is shorter than that of the first portion 1221, such that the opening for the electrical connector 200 of the battery to pass through is defined between the third portion 1223 and the bracket body 121, thereby facilitating the electrical connector 200 of the battery 11 to slide into the installation space.

By disposing the third portion 1223 to extend toward the bracket body 121, the displacement of the electrical connector 200 of the battery in the installation space along the height direction of the battery can be restricted, and the shaking of the electrical connector 200 in the height direction of the battery can be reduced.

In some embodiments, as shown in FIG. 10, an end surface of the free end of the third portion 1222 is an inclined surface, and the inclined surface includes a first edge away from the bottom of the case body 1122 and a second edge close to the bottom of the case body 1122. A distance from the first edge to the bracket body 121 is greater than a distance from the second edge to the bracket body 121. The end surface of the free end of the third portion 1222 is disposed as an inclined surface, thereby playing a guiding role, and enabling the electrical connector 200 to slide into the installation space more smoothly through the opening, so as to facilitate the installation and fixation of the electrical connector 200.

Figure 11:
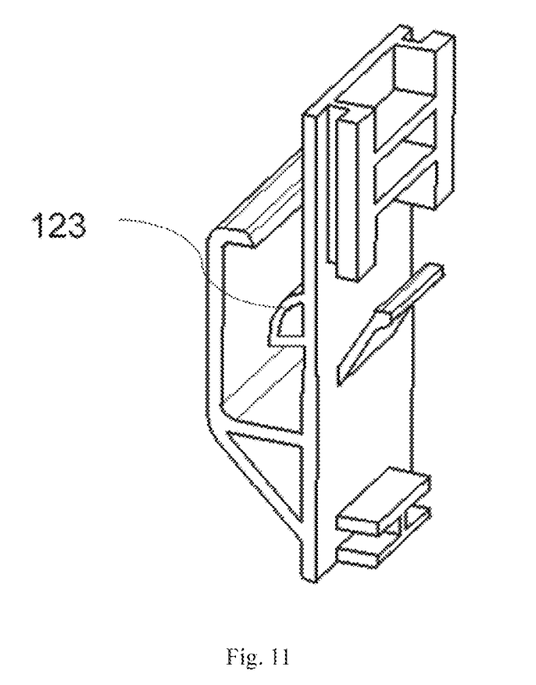
FIG. 11 is a schematic structural diagram of a bracket according to other embodiments of the present application.

In some embodiments, as shown in FIG. 10 and FIG. 11, a supporting member 123 is provided on the side of the bracket body 121 away from the base 110, and the supporting member 123 is formed with a guide surface 1231 for guiding the electrical connector 200 of the battery 11 to slide into the installation space.

The supporting member 123 is a protruding structure disposed on the side of the bracket body 121 away from the base 110.

The guide surface 1231 on the support 123 can guide the electrical connector 200 of the battery 11 to slide into the bottom of the installation space, and meanwhile, the support 123 can abut against the electrical connector 200 of the battery 11 to restrict the movement of the electrical connector 200 of the battery 11 in a direction perpendicular to the height direction of the battery, enabling the electrical connector 200 to be fixed in the installation space more tightly.

In some embodiments, as shown in FIG. 8 to FIG. 11, the supporting member 123 has a hollow structure that allows the supporting member 123 to be deformed such that the electrical connector 200 is clamped between the supporting member 123 and the second portion 1222.

The hollow structure may be a space defined between the supporting member 123 and the bracket body 121, or may be a hollow chamber disposed within the supporting member 123 itself.

In this way, the installation space can be equipped with different types of electrical connectors 200, thereby improving the applicability of the installation device 100.

In some embodiments, as shown in FIG. 10, the supporting member 123 is a semi-circular arc protrusion disposed on the side of the bracket body 121 away from the base 110.

In some embodiments, as shown in FIG. 11, the supporting member 123 is a ¼ arc protrusion disposed on the side of the bracket body 121 away from the base 110.

In some embodiments, as shown in FIG. 9, the base 110 further includes a bearing member 131, the bearing member 131 is disposed on the base 110, and the bearing member 131 is configured to hold the bracket 120 when the bracket 120 moves to the preset position relative to the base 110.

The bearing member 131 refers to a component for carrying the weight of the bracket 120 and the electrical connector 200 assembled onto the bracket 120. The bearing member 131 may be a plate-like structure disposed on the base 110 and extending along a direction perpendicular to the sliding direction of the bracket 120, so as to facilitate the support of the bracket 120.

Considering that the battery pack on the electric device 10 (such as an electric vehicle) has a very large volume and the electrical connecting member 200 such as the internal busbar has a relatively large weight, in the present application, the bearing member 131 is disposed on the base 110, and the bearing member 131 bears the weight of the bracket 120 and the electrical connector 200 when the bracket 120 moves to the preset position relative to the base 110. In this way, the bearing member 131 can provide a bearing force while restricting the bracket 120 from continuing to slide along the base 110, such that the bracket 120 can be stably connected to the base 110.

In some embodiments, as shown in FIG. 9, the base 110 further includes an extension member 132, the extension member 132 is located above the bearing member 131 and is connected with the bearing member 131, and the extension member 132 is configured to make the bracket 120 abut against the base 110 when the bracket 120 moves to the preset position relative to the base 110.

The extension member 132 refers to a component for restricting the movement of the bracket 120 relative to the base 110 in a direction perpendicular to the height direction of the battery. For example, the extension member 132 may be a plate-like structure disposed at the free end of the bearing member 131, a groove structure is defined by the extension member 132, the bearing member 131 and the bracket body 121, so the bracket 120 can be clamped into the groove structure when moving to the preset position.

In some embodiments, as shown in FIG. 10, the bracket 120 further includes a reinforcing rib 124, and the reinforcing rib 124 is disposed between the bracket body 121 and the holding member 122.

The reinforcing rib 124 may be a plate that is obliquely disposed between the bracket body 121 and the holding member 122. By providing the reinforcing ribs 124, the structural strength of the installation device 100 can be improved.

Based on the above-mentioned various embodiments, referring to FIG. 8 to FIG. 10, the present application provides the installation device 100. The installation device 100 includes the base 110 and the bracket 120, the base 110 is configured to be connected to the case body 1122, and the bracket 120 is disposed to assemble the electrical connector 200 of the battery 11 and is configured to be slidably connected with the base 110. The installation device 100 further includes the locking assembly 140 disposed on the base 110 and the bracket 120, the locking assembly 140 includes the slot 141 disposed on one of the base 110 and the bracket 120 and the inserting member 142 disposed on the other of the base 110 and the bracket 120, and the inserting member 142 is insertable into the slot 141 when the bracket 120 moves to the preset position relative to the base 110.

The base 110 of the installation device 100 in the embodiment of the present application is connected to the case body 1122 of the battery 11, the electrical connector 200 of the battery 11 is assembled onto the bracket 120, the bracket 120 is slidably connected to the base 110, and the locking assembly 140 is locked onto the base 1101 when the bracket 120 moves to the preset position relative to the base 110, thereby achieving a quick fixation of the electrical connector 200. By disposing the bracket 120 to be slidably connected to the base 110, the operation space required by the installation device 100 to fix the electrical connector 200 can be reduced, and the installation of the electrical connector 200 in a limited space can be realized. Furthermore, the space occupancy rate of the case body 1122 of the battery 11 by the installation device 100 can be reduced, the space utilization rate of the case body 1122 of the battery 11 can be improved, and thus the energy density of the battery 11 can be improved.

As shown in FIG. 2 to FIG. 6, an embodiment of the second aspect of the present application provides a battery 11, which includes the installation device 100 in the above embodiments.

The installation device 110 may be one or plural in number. The specific number may be flexibly set according to the scale of the battery 11.

In the battery 11 according to the embodiments of the present application, the installation device 100 is disposed on the case body 1122, the base 110 of the installation device 100 is connected to the case body 1122 of the battery 11, the electrical connector 200 of the battery 11 is assembled onto the bracket 120, and the bracket 120 is slidably connected with the base 110, thereby achieving a quick installation of the electrical connector 200. By disposing the bracket 120 to be slidably connected to the base 110, the operation space required by the installation device 100 to fix the electrical connector 200 can be reduced, and the installation of the electrical connector 200 in a limited space can be realized. Furthermore, the space occupancy rate of the case body 1122 of the battery 11 by the installation device 100 can be reduced, the space utilization rate of the case body 1122 of the battery 11 can be improved, and thus the energy density of the battery 11 can be improved.

As shown in FIG. 1, an embodiment of the third aspect of the present application provides an electric device, which includes the battery 11 in the above embodiments.

The electric device according to the embodiment of the present application uses the battery 11 described in the second aspect as a power supply system. The battery 11 includes an installation device 100, the installation device 100 includes the base 110 and the bracket 120, the base 110 of the installation device 100 is connected to the case body 1122 of the battery 11, the electrical connector 200 of the battery 11 is assembled onto the bracket 120, and the bracket 120 is slidably connected to the base 110, thereby achieving a quick installation of the electrical connector 200. By disposing the bracket 120 to be slidably connected to the base 110, the operation space required by the installation device 100 to fix the electrical connector 200 can be reduced, and the installation of the electrical connector 200 in a limited space can be realized. Furthermore, the space occupancy rate of the case body 1122 of the battery 11 by the installation device 100 can be reduced, the space utilization rate of the case body 1122 of the battery 11 can be improved, and thus the energy density of the battery 11 can be improved.

An embodiment of the fourth aspect of the present application provides a manufacturing method for the battery 11, including: providing the case body 1122; providing an installation device 100 including the base 110 and the bracket 120; connecting the base 110 to the case body 1122; connecting the bracket 120 slidably to the base 110; providing an electrical connector 200; assembling the electrical connector 200 onto the bracket 120.

For the battery 11 manufactured by the manufacturing method for the battery 11 in the embodiment of the present application, the installation device 100 is disposed on the case body 1122, the base 110 of the installation device 100 is connected to the case body 1122 of the battery 11, the electrical connector 200 of the battery 11 is assembled onto the bracket 120, and the bracket 120 is slidably connected to the base 110, thereby achieving a quick installation of the electrical connector 200. By disposing the bracket 120 to be slidably connected to the base 110, the operation space required by the installation device 100 to fix the electrical connector 200 can be reduced, and the installation of the electrical connector 200 in a limited space can be realized. Furthermore, the space occupancy rate of the case body 1122 of the battery 11 by the installation device 100 can be reduced, the space utilization rate of the case body 1122 of the battery 11 can be improved, and thus the energy density of the battery 11 can be improved.

An embodiment of the fifth aspect of the present application provides a manufacturing equipment (not shown in the figures) for the battery 11, including a first providing device, a second providing device, a third providing device and an assembling device. The first providing device is configured to provide the case body 1122; the second providing device is configured to provide the installation device 100, the installation device 100 including the base 110 and the bracket 120; the third providing device is configured to provide the electrical connector 200; and the assembling device is configured to connect the base 110 to the case body 1122, to connect the bracket 120 slidably to the base 110, and to assemble the electrical connector 200 onto the bracket 120.

For the battery 11 manufactured by the manufacturing equipment for the battery 11 according to the embodiment of the present application, the installation device 100 is disposed on the case body 1122, the base 110 of the installation device 100 is connected to the case body 1122 of the battery 11, the electrical connector 200 of the battery 11 is assembled onto the bracket 120, and the bracket 120 is slidably connected to the base 110, thereby achieving a quick installation of the electrical connector 200. By disposing the bracket 120 to be slidably connected to the base 110, the operation space required by the installation device 100 to fix the electrical connector 200 can be reduced, and the installation of the electrical connector 200 in a limited space can be realized. Furthermore, the space occupancy rate of the case body 1122 of the battery 11 by the installation device 100 can be reduced, the space utilization rate of the case body 1122 of the battery 11 can be improved, and thus the energy density of the battery 11 can be improved.

The above description only refers to preferred specific embodiments of the present disclosure, but the protection scope of the present disclosure is not limited thereto. Any changes or substitutions that can be easily conceived by any person skilled in the art within the technical scope disclosed in the present disclosure should be included within the protection scope of the present disclosure. Therefore, the protection scope of the present disclosure should be subject to the protection scope of the claims.

What is claimed is:

1. An installation device for a battery, the battery comprising a case body, wherein the installation device comprises:
    a base, configured to be connected to the case body; and
    a bracket, disposed to assemble an electrical connector of the battery and configured to be slidably connected with the base,
    wherein the installation device further comprises a sliding assembly, wherein the sliding assembly is disposed on the base and the bracket and is configured to enable the bracket to slide relative to the base along a first direction, the first direction being a height direction of the battery,
    the sliding assembly comprises a sliding guide and a sliding structure, wherein the sliding guide extends along the first direction and is disposed on one of the base and the bracket, the sliding structure is disposed on the other of the base and the bracket, and the sliding structure is slidably engaged with the sliding guide, and
    the sliding guide is a sliding groove, the sliding structure is a sliding block matched with the sliding groove, and the sliding structure is slidably engaged with the sliding groove.

2. The installation device according to claim 1, wherein the installation device further comprises a locking assembly, wherein the locking assembly is disposed on the base and the bracket, and the locking assembly is configured to lock the bracket onto the base when the bracket moves to a preset position relative to the base.

3. The installation device according to claim 2, wherein the locking assembly comprises a slot disposed on one of the base and the bracket and an inserting structure disposed on the other of the base and the bracket, and the inserting structure is capable of being inserted into the slot when the bracket moves to the preset position relative to the base.

4. The installation device according to claim 3, wherein the inserting structure is inclined relative to the sliding direction of the bracket.

5. The installation device according to claim 4, wherein a free end of the inserting structure is higher than a fixed end of the inserting structure.

6. The installation device according to claim 1, wherein the bracket comprises a bracket body and a holding structure, wherein the bracket body is slidably connected to the base, the holding structure is disposed on a side of the bracket body away from the base, and an installation space for assembling the electrical connector of the battery is defined between the holding structure and the bracket body.

7. The installation device according to claim 6, wherein the holding structure comprises a first portion connected to a side of the bracket body away from the base and a second portion located above the first portion and connected to the first portion, wherein the installation space for assembling the electrical connector of the battery is defined by the first portion, the second portion and the bracket body.

8. The installation device according to claim 7, wherein the holding structure further comprises a third portion connected to the second portion and extending toward the bracket body, wherein the installation space for assembling the electrical connector of the battery is defined by the first portion, the second portion, the third portion and the bracket body, and an opening for the electrical connector of the battery to pass through is defined between the third portion and the bracket body.

9. The installation device according to claim 8, wherein an end surface of a free end of the third portion is an inclined surface, wherein the inclined surface comprises a first edge away from a bottom of the case body and a second edge close to the bottom of the case body, and a distance from the first edge to the bracket body is greater than a distance from the second edge to the bracket body.

10. The installation device according to claim 7, wherein a supporting structure is provided on the side of the bracket body away from the base, and a guide surface for guiding the electrical connector of the battery to slide into the installation space is formed on the supporting structure.

11. The installation device according to claim 10, wherein the supporting structure has a hollow structure that allows the supporting structure to be deformed such that the electrical connector is clamped between the supporting structure and the second portion.

12. The installation device according to claim 1, wherein the base further comprises a bearing structure, wherein the bearing structure is disposed on the base, and the bearing structure is configured to bear the bracket when the bracket moves to a preset position relative to the base.

13. The installation device according to claim 12, wherein the base further comprises an extension structure, wherein the extension structure is located above the bearing structure and connected to the bearing structure, and the extension structure is configured to make the bracket abut against the base when the bracket moves to the preset position relative to the base.

14. The installation device according to claim 6, wherein the bracket further comprises a reinforcing rib, wherein the reinforcing rib is disposed between the bracket body and the holding structure.

15. A battery, comprising a case body, an electrical connector, and the installation device as claimed in claim 1, wherein the base of the installation device is connected to the case body, and the electrical connector is assembled onto the bracket of the installation device.

16. An electric device comprising a battery according to claim 5.

17. A manufacturing method for a battery, comprising:
providing a case body;
providing an installation device, the installation device comprising a base and a bracket;
connecting the base to the case body;
connecting the bracket slidably to the base;
providing an electrical connector; and
assembling the electrical connector onto the bracket,
wherein the installation device further comprises a sliding assembly, wherein the sliding assembly is disposed on the base and the bracket and is configured to enable the bracket to slide relative to the base along a first direction, the first direction being a height direction of the battery,
the sliding assembly comprises a sliding guide and a sliding structure, wherein the sliding guide extends along the first direction and is disposed on one of the base and the bracket, the sliding structure is disposed on the other of the base and the bracket, and the sliding structure is slidably engaged with the sliding guide, and
the sliding guide is a sliding groove, the sliding structure is a sliding block matched with the sliding groove, and the sliding structure is slidably engaged with the sliding groove.

* * * * *